United States Patent

Pearson

[11] 3,956,927
[45] May 18, 1976

[54] STRAIN GAUGE TRANSDUCER APPARATUS

[75] Inventor: Robert P. Pearson, St. Paul, Minn.

[73] Assignee: Honeywell Inc., Minneapolis, Minn.

[22] Filed: Sept. 29, 1975

[21] Appl. No.: 617,544

[52] U.S. Cl. .................... 73/88.5 SD; 73/398 AR
[51] Int. Cl.² ........................................ G01L 9/04
[58] Field of Search ............... 73/88.5 SD, 398 AR; 324/105; 307/310

[56] References Cited
UNITED STATES PATENTS

| | | | |
|---|---|---|---|
| 3,572,109 | 3/1971 | Yerman | 73/88.5 SD |
| 3,841,150 | 10/1974 | Pearson | 73/88.5 R |

*Primary Examiner*—Charles A. Ruehl

[57] ABSTRACT

Strain gauge transducer apparatus including circuitry for balancing current through a pair of strain sensitive semiconductor resistors is disclosed. A current source supplies constant electric current to a voltage divider and a first strain sensitive resistor which are connected to noninverting and inverting input terminals respectively of an operational amplifier. A second strain sensitive resistor is connected between the output and inverting input terminals of the amplifier to provide a feedback signal which balances the current through the strain sensitive resistors. Temperature compensation may be provided by forming the voltage divider of resistors having temperature coefficients matching those of the strain sensitive resistors, or by means of a temperature sensitive resistor in parallel with voltage divider.

11 Claims, 4 Drawing Figures

STRAIN GAUGE TRANSDUCER APPARATUS

BACKGROUND OF THE INVENTION

The invention herein described pertains generally to strain gauge apparatus, and more specifically to signal conditioning circuitry for semiconductor strain gauges.

It is well known to use strain sensitive resistors as transducers for sensing a variety of parameters. Typically one or more variable resistance elements are applied to a web or diaphragm which is subject to stress and/or strain produced by external conditions. Transfer of the strain to the resistance elements causes their resistance to change. These resistance changes can be detected by a variety of means, typically including bridge circuitry.

A relatively recent improvement in strain gauge transducers is the semiconductor strain gauge wherein the web or diaphragm comprises crystalline semiconductor material of one type (e.g., silicon doped with boron). This material forms a substrate into which p-type piezo-resistive elements can be diffused.

Silicon resistor strain gauges as described offer several important advantages over the more traditional wire strain gauges. One such advantage is the high sensitivity of a silicon strain gauge, typically in the order of 100 times that of a wire strain gauge. This large gauge factor does not depend on a change in geometry, but depends on a resistivity change caused by the strained crystal lattice. Conversely, other types of strain gauges, such as wire strain gauges, have gauge factors which depend on a change in geometry.

A second advantage is that silicon strain gauges can be diffused in a homogeneous crystalline silicon medium, thus providing sensing elements integrated into a silicon load bearing member. This avoids problems in bonded strain gauge apparatus resulting from bond degredation, as well as temperature sensitivity and hysteresis caused by the thermo-elastic strain.

A third advantage is that a silicon crystal is a superior force sensing material in that it does not permanently deform or yield.

A fourth advantage is that silicon strain gauges can be fabricated using common integrated circuit process technology.

A fifth advantage is that silicon diffused piezo-resistors can be manufactured in conventional integrated circuits to form true integrated circuit transducers, thus permitting a single chip of silicon to support both sensing and signal conditioning functions.

A strain sensor of the previously described type is disclosed in U.S. Pat. No. 3,853,650 issued Dec. 10, 1974 to Jerome T. Hartlaub, and assigned to the assignee of the present application. The patent further discloses an improved method for producing such silicon semiconductor strain sensors.

It has been common to determine stress and/or strain induced changes in resistivity of variable resistances transducer elements by means of bridge circuits. Representative of such arrangements are the systems shown in U.S. Pat. Nos. 3,457,493 and 3,836,796 issued to W. E. Shoemaker et al. on July 22, 1969 and J. E. Solomon et al. on Sept. 17, 1974 respectively. Both patents disclose systems in which strain sensitive resistors are connected to form Wheatstone bridge arrangements.

In order to achieve initial balance of a strain gauge bridge circuit it is normally necessary to place trimming resistors in series with or across the strain sensitive resistors. It is also highly desirable that the arms of the bridge exhibit effectively identical temperature response characteristics. This is particularly true in connection with piezo-resistive bridges because of the very large temperature dependence of piezo-resistive elements. However, it has been found difficult to simultaneously match the temperature coefficients and resistance values of the bridge arms.

The system of previously noted U.S. Pat. No. 3,457,493 discloses an arrangement for overcoming this problem by employing separate current sources in different arms of the bridge arrangement. A disadvantage of such a system is the requirement for more than one current source.

The advantages of maintaining a constant current through the strain sensitive resistors, while avoiding the complications of the system of U.S. Pat. No. 3,457,493, is disclosed in U.S. Pat. No. 3,841,150 issued Oct. 15, 1974 to the same inventor and assigned to the same assignee as the present application. A principal feature of the system of U.S Pat. No. 3,841,150 is that two strain gauge resistors are biased by operational amplifiers in a manner which maintains a constant current flow through the resistors. A portion of the measurement signal is fed back to the operational amplifiers in order to increase response linearity. A temperature correction circuit maintains the ratio of the change in output signal relative to the change in input signal at a substantially constant value over a wide range of temperatures.

The circuit of U.S. Pat. No. 3,841,150 has been found to provide excellent performance in demanding and critical applications, such as in military aircraft systems. However, there are a number of less critical applications wherein performance requirements are not as demanding and wherein simplicity and low cost are exceptionally important. The circuit of U.S. Pat. No. 3,841,150 tends to be overly complex and expensive for such applications.

In line with the requirement simplicity and low cost, the applicant has discovered a unique simplified strain gauge system in which satisfactory performance is achieved with extremely simple signal conditioning circuitry. The advantages of constant current exitation of the strain sensitive resistors are maintained. Substantially constant current flow through the strain sensitive resistors is achieved with basically only a single operational amplifier and a minimum number of other non-critical electronic components.

SUMMARY OF THE INVENTION

The applicant's strain gauge apparatus basically comprises a current source which supplies a constant current to a voltage divider and a first strain sensitive resistor which are respectively connected to noninverting and inverting inputs of an operational amplifier. A second strain sensitive resistor connects the output and inverting inputs of the operational amplifier. The first and second strain sensitive resistors are formed in a common substrate and oriented to respond oppositely to environmental conditions affecting the substrate. Corrections for temperature induced variations in circuit response may be provided by a temperature sensitive resistor connected across the voltage divider. Alternatively, the voltage divider may be formed of resistors having temperature response characteristics matching those of the strain sensitive resistors.

Accordingly, it is a primary object of this invention to provide strain gauge apparatus having exceptionally simple signal conditioning circuitry.

It is a further object of this invention to provide unique circuitry for maintaining substantially constant current flow through the resistance elements of a strain gauge transducer by means of circuitry basically comprising a single operational amplifier and a minimum number of noncritical electronic components.

A further object is to provide simple strain gauge signal conditioning circuitry wherein first order temperature compensation is achieved by simple temperature dependent resistance means.

Additional objects of the present invention may be ascertained from a study of the disclosure, drawings, and appended claims.

DESCRIPTION OF THE PREFERRED EMBODIMENTS

Figure 1:
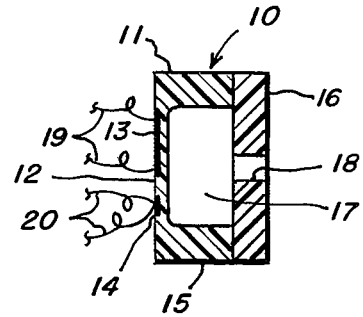
FIG. 1 is a cross-sectional view of a pressure transducer wherein the transducing elements comprise piezo-resistive elements formed in a common substrate diaphragm.
Figure 2:
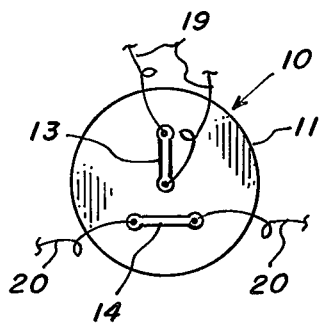
FIG. 2 is a plan view of the diaphragm of the transducer of FIG. 1 showing the orientation of the piezo-resistive elements.

FIGS. 1 and 2 illustrate a preferred form of a strain gauge transducer assembly, generally designated by reference numeral 10, for use in the present invention. Transducer 10 is shown as a pressure transducer. However, the present invention is equally applicable to any type of transducer wherein a pair of piezo-resistive elements are mounted so as to respond oppositely to a condition of interest. In pressure transducer 10, the piezo-resistive elements are formed in a diaphragm. In other applications, the piezo-resistive elements may be formed in a beam or web subject to stress by external forces.

Pressure transducer 10 is shown as comprising a unitary cup-shaped silicon substrate 11 of which one surface forms a relatively thin circular diaphragm 12. Diaphragm 12 has a major surface thereon into which is diffused radial and tangential piezo-resistive elements 13 and 14 respectively. Substrate 11 with diffused resistors 13 and 14 may be formed as disclosed in previously identified U.S. Pat. No. 3,853,650. The major surface preferably lies in the (100) crystal plane. As also shown in the patent, substrate 11 includes an integral peripheral constraint portion 15.

Pressure transducer 10 is shown fitted with a silicon back plate 16 to enclose a pressure chamber 17. Back plate 16 has an aperture 18 therethrough for admitting pressure into chamber 17. Back plate 16 is preferably bonded to substrate 11 with a very thin gold-silicon eutectic bond.

Leads 19 and 20 are shown for carrying signals from resistive elements 13 and 14 respectively. However, it is pointed out that certain of the components for receiving the signals from elements 13 and 14 may also be formed on substrate 11 by integrated circuit processes, thus eliminating the need for discrete leads such as 18 and/or 19.

Figure 3:
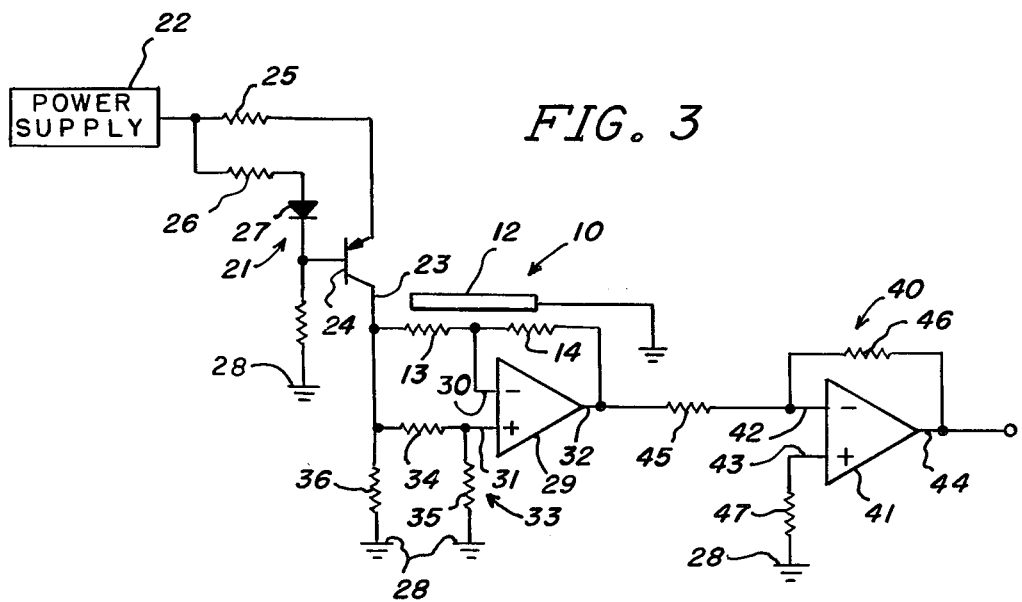
FIG. 3 is a circuit diagram of one embodiment of strain gauge signal conditioning circuitry in accordance with the applicant's invention for use with strain gauge transducers of the type shown in FIGS. 1 and 2.
Figure 4:
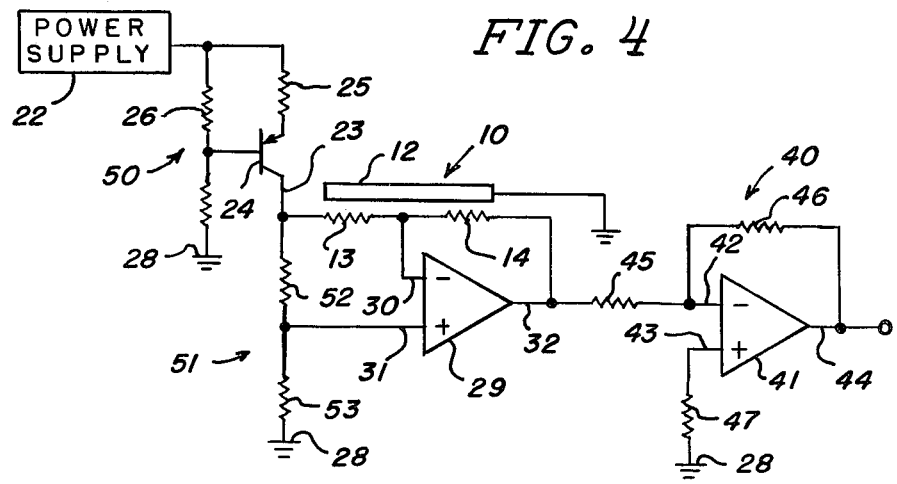
FIG. 4 is a circuit diagram of a second embodiment of signal conditioning circuitry in accordance with the applicant's invention.

FIGS. 3 and 4 show alternative embodiments of unique signal conditioning circuitry which may be used with transducer 10. In each of FIGS. 1–4, transducer 10, diaphragm 12 and piezo-resistive elements 13 and 14 are respectively designated by the same reference numerals.

In the circuit of FIG. 3, a constant current source generally identified by reference numeral 21 is connected to receive electric current from a power supply 22, and supplies substantially constant current through a conductor 23. Current source 21 comprises a PNP transistor 24 having its emitter connected to power supply 22 through a resistor 25 and its collector connected to conductor 23. The base of transistor 24 is connected to power supply 22 through a series connected resistor 26 and diode 27. Diode 27 is oriented so that its cathode is connected to resistor 26 and its anode is connected to the base of transistor 24. The base of transistor 24 is also connected to a current sink or source of reference potential 28 shown at ground or zero voltage.

Radial resistive element 13 is connected between conductor 23 and the inverting input terminal of a first operational amplifier of which the inverting input, non-inverting input and output terminals are identified by reference numerals 30, 31 and 32 respectively. Tangential resistive element 14 is connected between output terminal 32 and inverting input terminal 30.

A voltage divider generally identified by reference numeral 33, comprising series connected resistors 34 and 35, is connected between conductor 23 and current sink or reference potential source 28. An output tap of voltage divider 33 is connected to noninverting input terminal 31 of amplifier 29.

A temperature sensitive resistor 36 is connected between conductor 23 and current sink or reference potential source 28. Resistor 36 is preferably a silicon resistor having temperature response characteristics substantially identical to those of resistive elements 13 and 14.

The nominal resistances of strain sensitive resistors 13 and 14 and voltage divider resistors 34 and 35 are all substantially equal. The voltage at output terminal 32 is maintained substantially equal to the voltage at noninverting input terminal 31. Since the resistances of resistive elements 13 and 14 and temperature sensitive resistor 36 all vary with temperature in substantially the same manner, the current through resistive elements 13 and 14 is prevented from varying significantly with changes in temperature. More specifically, if the temperature varies such that the resistances of resistors 13, 14 and 36 decrease, the voltage on conductor 23 also decreases, thus maintaining a substantially constant current through resistive elements 13 and 14. Conversely, if the temperature varies such that the resistances of the resistors increase, the voltage on conductor 23 also increases.

Output means generally identified by reference numeral 40 is connected to output terminal 32 of operational amplifier 29. Output means 40 comprises a second operational amplifier 41 having inverting and non-inverting terminals 42 and 43 respectively and an output terminal 44. Inverting input terminal 42 is connected to output terminal 32 of amplifier 29 through a resistor 45 and to output terminal 44 through a feedback resistor 46. Noninverting input terminal 43 is connected to current sink or reference potential source 28 through a resistor 47.

The circuit embodiment shown in FIG. 4 is a variation of the circuit embodiment shown in FIG. 3. Common elements are identified by like reference numerals in both figures. As described in connection with the embodiment of FIG. 3, power supply 22 of FIG. 4 supplies electric current to a constant current source generally identified by reference numeral 50. Current source 50 is identical to current source 21 except that current source 50 contains no diode corresponding to diode 27 in current source 21. Elimination of this diode causes the current output of source 50 to vary somewhat with temperature. Fortuitously, the variation tends to compensate for nonlinearities in response of the circuitry comprising resistive elements 13 and 14 and the voltage divider which is generally identified if FIG. 4 by reference numeral 51.

Voltage divider 51 differs from voltage divider 33 in that resistors 52 and 53 which form the voltage divider are silicon resistors having temperature response characteristics substantially identical to the temperature response characteristics of resistive elements 13 and 14. Accordingly, the need for a separate temperature sensitive resistor corresponding to resistor 36 in the circuit of FIG. 3 is eliminated.

The remaining portions of the circuit of FIG. 4 are identical to corresponding portions of the circuit of FIG. 3. Reference may be made to the operational description of the circuit of FIG. 3 for further understanding of operation of the circuit of FIG. 4.

In accordance with the foregoing description, the unique signal conditioning circuitry of FIGS. 3 and 4 provides substantially constant current through a pair of strain sensitive resistors by means of circuitry of minimum complexity. Current control is achieved with basically a single operational amplifier and an associated network comprising a minimum number of noncritical electrical components. Accordingly, strain gauge apparatus having satisfactory performance for many applications is provided with circuitry of minimum complexity and cost.

Although the disclosed embodiments of the applicant's strain gauge transducer apparatus with simplified signal conditioning circuitry pertains specifically to pressure sensing, the novel features of the apparatus, including the unique simplified signal conditioning circuitry, are useful in other applications. Other embodiments which do not depart from the applicant's contemplation and teaching will be apparent to those skilled in the art. The applicant does not intend that coverage be limited to the disclosed embodiment, but only by the terms of the appended claims.

What is claimed is:

1. In strain gauge apparatus of a type wherein first and second strain sensitive resistors carried on a common substrate are oriented so that the resistors respond oppositely to environmental conditions affecting the substrate, improved circuitry for determining the environmental forces by measuring variations in an electrical property of the resistors comprising:
an operational amplifier having inverting and noninverting input terminals and an output terminal;
a current source for supplying substantially constant electric current;
a current sink;
means connecting the first strain sensitive resistor between the current source and the inverting input terminal of said operational amplifier;
means connecting the second strain sensitive resistor between the output and inverting input terminals of said operational amplifier;
a voltage divider connected between said current source and said current sink, said voltage divider having an output tap;
means connecting the output tap of said voltage divider to the noninverting input terminal of said operational amplifier; and
output means connected to the output terminal of said operational amplifier.

2. The strain gauge apparatus of claim 1 wherein:
the first and second strain sensitive resistors have substantially identical temperature response characteristics; and
a temperature sensitive resistor having substantially the same temperature response characteristics as the first and second strain sensitive resistors is connected between said current source and said current sink.

3. The strain gauge apparatus of claim 2 wherein said current source comprises:
an input terminal for receiving electric current from a power supply;
a transistor having emitter, collector and base electrodes;
a constant current output terminal;
a first resistor;
means connecting said transistor through its emitter and collector electrodes and said first resistor in series between said input and constant current output terminals;
a second resistor;
connecting means connecting said second resistor between said input terminal and the base electrode of said transistor; and
a third resistor connecting the base electrode of said transistor to said current sink.

4. The strain gauge apparatus of claim 3 wherein said connecting means comprises a diode in series with said second resistor.

5. The strain gauge apparatus of claim 1 wherein:
the first and second strain sensitive resistors have substantially identical temperature response characteristics; and
said voltage divider comprises series connected resistance elements having substantially the same temperature response characteristics as the first and second strain sensitive resistors.

6. Strain gauge apparatus comprising:
first and second strain sensitive resistors carried on a substrate and oriented so that the resistors respond oppositely to stress in the substrate resulting from varying environmental conditions;
an operational amplifier having inverting and noninverting input terminals and an output terminal;
a first voltage source at a reference voltage;
a second voltage source at a voltage different from the reference voltage;
means connecting said first strain sensitive resistor between said second voltage source and the inverting input terminal of said operational amplifier;
means connecting said second strain sensitive resistor between the output and inverting input terminals of said operational amplifier;

a voltage divider connecting said first and second voltage sources, said voltage divider having an output tap; and means connecting the output tap of said voltage divider to the noninverting input terminal of said operational amplifier.

7. The strain gauge apparatus of claim 6 wherein:

said substrate comprises a circular diaphragm of silicon material having an integral peripheral constraint; and said first and second strain sensitive resistors are diffused into the diaphragm.

8. The strain gauge apparatus of claim 7 wherein the diaphragm is formed so that the surface carrying said first and second strain sensitive resistors is in the (100) crystal plane.

9. The strain gauge apparatus of claim 8 wherein:

said first and second strain sensitive resistors have substantially identical temperature response characteristics; and a temperature sensitive resistor having substantially the same temperature response characteristics as said first and second strain sensitive resistors is connected between said first and second voltage sources.

10. The strain gauge apparatus of claim 9 wherein said second voltage source comprises:

an input terminal for receiving electric current from a power supply;

a transistor having emitter, collector and base electrodes;

a constant current output terminal;

a first resistor;

means connecting said transistor through its emitter and collector electrodes and said first resistors in series between said input and constant current output terminals; and a series arrangement of second and third resistors and a diode connecting said input terminal to said first voltage source, said series arrangement having an intermediate tap connected to the base of said transistor.

11. The strain gauge apparatus of claim 10 including:

an output amplifier having input and output terminals; and means connecting the output terminal of said operational amplifier to the input terminal of said output amplifier.

* * * * *